United States Patent [19]

Otsuka

[11] Patent Number: 5,290,844
[45] Date of Patent: Mar. 1, 1994

[54] WATER-SWELLABLE ADHESIVE WATER STOP

[75] Inventor: Eiichi Otsuka, Konosu, Japan
[73] Assignee: C. I. Kasei Co., Ltd., Tokyo, Japan
[21] Appl. No.: 753,784
[22] Filed: Sep. 3, 1991

Related U.S. Application Data

[63] Continuation-in-part of Ser. No. 555,084, Jul. 19, 1990, abandoned.

[30] Foreign Application Priority Data

Jul. 28, 1989 [JP] Japan ................................. 1-196039
Apr. 9, 1990 [JP] Japan ................................. 2-93682

[51] Int. Cl.$^5$ ............................................. C08K 3/26
[52] U.S. Cl. ................................. 524/426; 524/433; 524/447; 524/574; 524/503; 524/442
[58] Field of Search ............... 524/442, 426, 433, 447, 524/574, 503

[56] References Cited

U.S. PATENT DOCUMENTS 4,366,284 12/1982 Ishida et al. ........................ 524/575
4,590,227 5/1986 Nakamura et al. ................... 525/57
4,740,404 4/1988 Otsuga et al. ........................ 52/232
5,075,373 12/1991 Takemori et al. ..................... 525/57

*Primary Examiner*—John C. Bleutge
*Assistant Examiner*—Mark Sweet
*Attorney, Agent, or Firm*—Wyatt, Gerber, Burke and Badie

[57] ABSTRACT

The water-swellable adhesive water stop of the invention is advantageous in respect of the improved workability and high water-stopping power as a consequence of the unique formulation of the rubber composition from which the water stop is prepared by shaping and vulcanization. The rubber composition comprises: (A) a butyl rubber; (B) a highly water-absorptive resin; (C) an inorganic water-absorbent; (D) a tackifier; (E) a plasticizer; (F) a vulcanizing agent; and, optionally, (G) a basic filler each in a limited amount relative to the component (A). The water stop is further characterized by a tensile strength in the range from 1 to 30 kgf/cm$^2$, 100% elastic modulus in the range from 1 to 4 kgf/cm$^2$, ultimate elongation at break of at least 300% and degree of swelling in water in the range from 150 to 500% by weight after immersion in water for 21 days at 23° C.

7 Claims, No Drawings

WATER-SWELLABLE ADHESIVE WATER STOP

BACKGROUND OF THE INVENTION

This is a continuation-in-part application from a co-pending U.S. patent application Ser. No. 07/555,084 filed Jul. 19, 1990 now abandoned.

The present invention relates to a novel water-swellable adhesive water stop. More particularly, the invention relates to a water-swellable adhesive water stop improved in respect of the workability and capable of exhibiting a high water-stopping efficiency.

A water stop is a shaped body widely used to prevent leakage of water by filling gap spaces, interstices, cracks, fissures and the like responsible for leakage of water therethrough, for example, in the joints of precast concrete bodies, construction joints of mortar or concrete works, joints in water-supply pipes and the like in civil engineering works and building construction works in general. As a trend in recent years, in particular, so-called water-swellable water stops are highlighted in respect of the high efficiency of water leakage prevention with a capability of complying with any subsequent expansion of the joint gaps after the construction works by virtue of the volume increase of the water stop by swelling in water.

The major current in the above mentioned water stops in the prior art is in the use of those of the complete-vulcanization type. A problem in the use of the water stops of this type is in the relatively low working efficiency therewith due to the requirement of a considerably high fastening pressure to completely fill up the gaps in a joint between irregular or rugged surfaces or at a corner portion of concrete bodies because the water stop material usually has a high tensile strength Tb and high compressive elastic resilience. Accordingly, it is eagerly desired to develop a novel water-swellable water stop material improved in this regard.

Besides, known water stops include those formulated with a readily deformable water-resistant material, such as rubbers, plastics, bitumens and the like, as a base. The water stops formulated with these base materials, however, are not always quite satisfactory in respect of their poor compliance with the changes in the dimensions of the gaps filled therewith due to the decrease in the elastic resilience or appearance of the phenomenon of creeping after a long time of service so as to cause a loss in the leakage-preventing power. Water stops of the water-swellable vulcanized-rubber type have also been proposed although they still have a problem to be solved in respect of the poor working efficiency as a consequence of the initial leakage-preventing effect exhibited largely depending on the adhesive and the compressive elastic resilience of the rubber.

On the other hand, water stops formulated with an adhesive butyl rubber are under prevailing use as a water stop for gap-filling applications despite the defects due to the relatively large permanent compression set and poor restorability thereof. Water-swellable adhesive water stops formulated with a butyl rubber have been proposed as an improved modification of the above but they, being of the unvulcanized-rubber type, have a defect in the basic properties that the water stop is susceptible to collapsing under the swelling pressure which the water stop cannot withstand when swollen with water.

SUMMARY OF THE INVENTION

The present invention accordingly has an object to provide an improved water-swellable adhesive water stop of excellent performance by fully overcoming the above described problems and disadvantages in the conventional water-swellable water stops, which is imparted simultaneously with the good workability possessed by the unvulcanized adhesive butyl rubbers in the prior art and the good leakage preventing power of the water-swellable water stops of the vulcanized-rubber type and capable of exhibiting excellent adhesiveness, relatively small compressive elastic resilience, good workability in gap-filling works and high leakage-preventing effect under the surface-contacting pressure by the rapid swelling with water to fully comply with separation of the jointed surfaces in the joint after working along with a sufficiently high material strength to withstand the swelling pressure which might cause collapsing of the water stop.

Thus, the water-swellable adhesive water stop of the present invention, which has been completed as a result of the extensive investigations undertaken by the inventor, is a shaped and vulcanized body of a composition comprising:

(A) 100 parts by weight of a butyl rubber;
(B) from 1 to 50 parts by weight of a highly water-absorptive resin;
(C) from 30 to 200 parts by weight of an inorganic water-absorbent, preferably, having basicity;
(D) from 10 to 50 parts by weight of a tackifier;
(E) from 30 to 200 parts by weight of a plasticizer;
(F) from 1 to 10 parts by weight or, preferably, from 1 to 5 parts by weight of a vulcanizing agent or a combination thereof with a vulcanization accelerator; and
(G) optionally, up to 300 parts by weight of a basic filler, and has a tensile strength Tb in the range from 1 to 30 kgf/cm$^2$, a 100% elastic modulus in the range from 1 to 4 kgf/cm$^2$, ultimate elongation at break Eb of at least 300% and water-swellability $S_{21}$ in the range from 150 to 500% at 23° C.

The above mentioned water-swellability $S_{21}$ or, generally, $S_n$ is defined by the ratio in % of the weight of the material swollen by keeping in water at 23° C. for 21 days or n days to the weight of the same material before swelling with water.

DETAILED DESCRIPTION OF THE PREFERRED EMBODIMENTS

As is described above, the water-swellable rubber composition, from which the inventive water stop is prepared, comprises several essential ingredients including a vulcanizing agent to effect crosslinking of the rubbery matrix to a controlled extent. Recently, Otsugu et al. disclosed a water stop in U.S. Pat. No. 4,740,404 by utilizing a water-swellable rubber composition. The disclosure there, however, is that the rubber composition contains no vulcanizing agent. Namely, the most characteristic feature of the invention is that the rubbery matrix is partially crosslinked by using an adequate amount of the vulcanizing agent to give several advantages that the rubber composition has excellent moldability with good plastic deformability, that the partially crosslinked composition after vulcanization is highly resistant against collapsing in water even after swelling in a large ratio of expansion and, consequently, that the water stop with the composition after vulcanization can exhibit excellent water-stopping performance.

The butyl rubber or isobutylene-based rubber used as the component (A) in the present invention includes so-called butyl rubbers as a copolymeric rubber of isobutylene and a small amount of isoprene, which should preferably have a degree of unsaturation of 0.3 to 3.0% by moles, and halogenated butyl rubbers, e.g., chlorinated and brominated butyl rubbers, which should preferably have a degree of unsaturation of 0.1 to 3.0% by moles and a halogen content of 0.3 to 3.0% by weight. In particular, chlorinated and brominated butyl rubbers are preferred in respect of the high reactivity.

The highly water-absorptive resin used as the component (B) in the present invention is a polymeric electrolyte having a crosslinked structure capable of absorbing water in an amount of several tens to several hundreds times by weight based on the weight of the polymer at room temperature and serves as a swelling-supporting material and includes, for example, poly(acrylic acid)-based ones, modified poly(vinyl alcohol)-based ones, copolymers of vinyl alcohol and acrylic acid, copolymers of an olefin and maleic anhydride and the like. The last mentioned copolymers of an olefin and maleic anhydride, such as a commercially available product sold under the tradename of KI Gel, are preferred. The amount of this component (B) is usually in the range from 1 to 50 parts by weight or, preferably, from 3 to 40 parts by weight per 100 parts by weight of the component (A). When the amount of the component (B) is too small, the water stop prepared from the composition would be poor in the water-swellability showing only insufficient degree of expansion by swelling or taking an unduly long time for swelling resulting in a poor water leakage-preventing power. When the amount of the component (B) is too large, on the other hand, the water stop may exhibit an excessively large swelling pressure eventually resulting in collapsing of the water stop bodies per se or cracking of the concrete bodies by the back-pressure of the back-fills.

The component (C) compounded in the water-swellable composition for the water stop can be any of inorganic powdery materials capable of swelling by absorbing water in an amount of several to several tens times by weight based on the dry weight of the powder at room temperature. Examples of such an inorganic water-absorbent include, for example, silicic acid compounds such as hydrated silicic acid, hydrated silicates and the like, bentonites mainly composed of montmorillonite and so on. The inorganic water-absorbent as the component (C) should preferably have basicity as determined by the pH of at least 8 or, preferably, at least 9 of a 10% by weight aqueous suspension thereof. The amount of the component (C) compounded in the water-swellable composition is usually in the range from 30 to 200 parts by weight or, preferably, from 50 to 150 parts by weight per 100 parts by weight of the component (A). When the amount of the component (C) is too small, the water stop prepared from the composition would be poor in the water-swellability showing only insufficient degree of expansion by swelling or taking an unduly long time for swelling resulting in a poor water leakage-preventing power, in particular, at the initial stage. When the amount of the component (C) is too large, on the other hand, the workability with the water stop would be poor due to the eventual collapsing or hardening of the water stop bodies when swollen with water.

The component (D) compounded in the water-swellable composition for the inventive water stop is a tackifier which is exemplified by petroleum resins including those of the aliphatic, aromatic, alicyclic, copolymeric and hydrogenated types, terpene resins including polyterpenes, terpene-phenol resins and the like, xylene resins including modified xylene resins, phenolic resins including alkylphenol resins, modified phenol resins and the like, coumaroneindene resins, rosins, rosin-based resins including modified rosins and the like, shellacs, dammar resins, copal resins, polybutenes, polyisobutylenes, liquid polychloroprenes, liquid polybutadienes and the like. The amount of the component (D) is usually in the range from 10 to 50 parts by weight or, preferably, from 15 to 40 parts by weight per 100 parts by weight of the component (A). When the amount of the component (D) is too small, the water stop would only have poor adhesiveness and the impregnability thereof to joint gaps is decreased. When the amount thereof is too large, on the other hand, the surface of the water stop is imparted with hydrophobicity more or less so that the water stop is less water-swellable not to fully exhibit the desired water leakage preventing power.

The component (E) compounded in the water-swellable composition for the inventive water stop is a plasticizer which is exemplified by plasticizers of phthalic acid-mineral oil of the paraffinic, naphthenic or aromatic type, phosphate ester-based plasticizers, adipate-based plasticizers, sebacate-based plasticizers, stearic acid, palmitic acid, castor oil, cottonseed oil, rapeseed oil, paraffins, chlorinated paraffins and the like. The amount of the plasticizer as the component (E) compounded in the water-swellable composition for the inventive water stop is usually in the range from 30 to 200 parts by weight or, preferably, from 50 to 150 parts by weight per 100 parts by weight of the component (A). When the amount thereof is too small, the composition is imparted with increased hardness resulting in poor workability of the water stop prepared therefrom. When the amount thereof is too large, on the other hand, the composition is imparted with decreased hardness so that the water stop prepared therefrom would be under a risk of eventual collapsing by swelling with water after working.

The component (F) compounded in the water-swellable composition for the inventive water stop is a vulcanizing agent or a vulcanization accelerator. These two types of additives can be used in combination according to need. Examples of suitable vulcanizing agent include sulfur, modified phenolic resins such as methylolated alkylphenol resins, brominated alkylphenol resins and the like and thiuram compounds such as tetramethyl thiuram disulfide, tetramethyl thiuram monosulfide and the like. Examples of suitable vulcanization accelerator include thiourea compounds such as mercaptoimidazoline and the like, thiazole compounds such as mercaptobenzothiazole, dibenzothiazyl disulfide and the like and carbamate compounds such as zinc dimethyl dithiocarbamate, copper dimethyl dithiocarbamate and the like. It is usually preferable that a vulcanizing agent and a vulcanization accelerator are used in combination. The amount of the component (F) is usually in the range from 1 to 10 parts by weight or, preferably from 1 to 5 parts by weight per 100 parts by weight of the component (A). When the amount of the component (F) is too small, the crosslinking density in the water stop would be too low so that the water stop body has poor mechanical strengths resulting in eventual collapsing of the water stop body after swelling with water. When the amount of the component (F) is too large, on the other hand, the water stop after vulcanization exhibits an unduly high elastic resilience requiring a large fastening pressure in filling an interstice therewith to cause a decrease in the workability and the water-swellability of the water stop is poor resulting in a greatly decreased velocity of swelling as well as a decreased expansion in addition to the undesirable phenomenon of blooming caused on the surface of the water stop if not to mention the increase in the costs due to the relative expensiveness of these additive compounds.

When the component (F) is a combination of a vulcanizing agent and a vulcanization accelerator, the amount of the vulcanization accelerator is usually not to exceed a half amount of the component (F) as a total or, preferably, in the range from 0.5 to 2.5 parts by weight per 100 parts by weight of the component (A).

Further, the water-swellable composition for the inventive water stop is compounded optionally with a basic filler as the component (G), especially, when the inorganic water-absorbent as the component (C) has no basicity. The basic filler here implied includes various kinds of inorganic fillers of which a 10% by weight aqueous suspension has a pH of 8 or higher or, preferably, 9 or higher as exemplified by magnesium carbonate hydroxide, calcium carbonate hydroxide and the like. Compounding of the component (G) has an effect to accelerate water absorption and swelling of the water stop when it is contacted with water so that the initial water-stopping effect can be rapidly exhibited. The amount of the component (G) usually should not exceed 300 parts by weight or, preferably, should not exceed 200 parts by weight per 100 parts by weight of the component (A). When the amount thereof is too large, the water leakage preventing power of the water stop may be somewhat decreased.

In addition to the above described components, it is optional that the water-swellable composition for the inventive water stop is admixed with various kinds of additives conventionally compounded in the prior art water stops each in a limited amount. Some of such optional additives include aging retarders, fillers, coloring agents, processing aids and the like. Examples of the aging retarder include amine compounds, phenolic compounds and the like. Examples of the filler include calcium carbonate, zinc oxide, hard clay, carbon black and the like.

The water-swellable adhesive water stop of the invention can be prepared by uniformly compounding the above described components each in a specified amount by using a suitable blending machine such as a pressurizable kneader and the like to give a water-swellable composition and then shaping and vulcanizing the shaped composition to such an extent that the vulcanized composition may have a tensile strength Tb in the range from 1 to 30 kgf/cm$^2$, 100% elastic modulus in the range from 1 to 4 kgf/cm$^2$, ultimate elongation at break Eb of at least 300% and degree of swelling $S_{21}$ in the range from 150 to 500%. The definition of the degree of swelling $S_{21}$ is given before. The water-swellable composition can be shaped by any known shaping method including extrusion molding, compression molding and the like.

The water-swellable adhesive water stop prepared in the above described manner exhibits excellent performance for water leakage prevention with various advantages including high adhesiveness to the substrate surface, relatively small compressive elastic resilience, good workability such as impregnability in working to any narrow gaps, follow-up behavior to the gap expansion after working by virtue of swelling with water and sufficiently high strengths to withstand the collapsing force caused by excessive swelling.

Accordingly, the water-swellable adhesive water stop of the invention can be used in a wide field of applications not only in civil engineering and architectural works of construction and maintenance for the prevention of water leakage through the joints in the shield tunnel works and shield segments, joints of precast concrete bodies such as precast concrete pipes, precast culvert boxes and the like, construction joints in concrete structures, joints between steel-made bodies such as U-flumes, corrugated pipes and the like but also as various kinds of repair materials and water-retaining material in agriculture and horticulture.

In the following, examples are given to illustrate the present invention in more detail but not to limit the scope of the invention in any way. The term of "parts" appearing in the following always refers to "parts by weight". The materials used in the following examples for compounding are specified as follows.

(I) Butyl rubber A: Exxon Butyl 268, a product by Exxon Chemical Co.
(II) Butyl rubber B: Exxon Butyl 065, a product by Exxon Chemical Co.
(III) Butyl rubber C: Exxon Bromobutyl 2244, a product by Exxon Chemical Co.
(IV) Highly water-absorptive resin: KI Gel, a product by Kuraray Co.
(V) Inorganic water-absorbent A: Nipsil VN-3, a product by Nippon Silica Kogyo Co. (hydrated silicic acid, neutral)
(VI) Inorganic water-absorbent B: Nipsil NA, a product by Nippon Silica Kogyo Co. (hydrated silicic acid, basic)
(VII) Tackifier: petroleum resin Escorez 1102, a product by Tonex Co.
(VIII) Plasticizer: naphthenic process oil
(IX) Vulcanizing agent A: sulfur
(X) Vulcanizing agent B: tetramethyl thiuram disulfide
(IX) Vulcanization accelerator: mercaptobenzothiazole
(XII) Basic filler A: magnesium carbonate hydroxide
(XIII) Basic filler B: calcium carbonate hydroxide

EXAMPLE 1

A butyl rubber compound was prepared by thoroughly blending, in a pressurizable kneader for 30 minutes, 100 parts of the butyl rubber A, 20 parts of the highly water-absorptive resin, 80 parts of the inorganic water-absorbent A, 20 parts of the tackifier, 80 parts of the plasticizer, 2 parts of the vulcanizing agent A, 1 part of the vulcanization accelerator, 5 parts of zinc oxide, 75 parts of calcium carbonate and 20 parts of carbon black. The compound was extrusion-molded from a 60 mm-diameter extruder machine having a screw rotating at 40 rpm and a die kept at a temperature of 80° C. and the shaped compound was vulcanized by heating at 170° C. for 8 minutes.

The thus shaped and vulcanized test bodies had a tensile strength of 19.0 kgf/cm$^2$, 100% elastic modulus of 2.5 kgf/cm$^2$, ultimate elongation at break of 1200% and degree of swelling $S_{21}$ of 250%. The test bodies swollen with water maintained the shape before swelling without collapsing.

EXAMPLE 2

A butyl rubber compound was prepared in the same manner as in Example 1 by thoroughly blending 50 parts of the butyl rubber B, 50 parts of the butyl rubber C, 40 parts of the highly water-absorptive resin, 30 parts of the inorganic water-absorbent A, 25 parts of the tackifier, 75 parts of the plasticizer, 1.5 parts of the vulcanizing agent A, 0.8 part of the vulcanizing agent B, 4 parts of zinc oxide, 60 parts of calcium carbonate and 16 parts of carbon black. The compound was extrusion-molded in the same manner as in Example 1 and the shaped compound was vulcanized by heating at 170° C. for 10 minutes.

The thus shaped and vulcanized test bodies had a tensile strength of 18.0 kgf/cm$^2$, 100% elastic modulus of 2.0 kgf/cm$^2$, ultimate elongation at break of 1350% and degree of swelling $S_{21}$ of 420%. The test bodies swollen with water maintained the shape before swelling without collapsing.

EXAMPLE 3

A rubber compound was prepared in the same manner as in Example 1 by thoroughly blending 100 parts of the butyl rubber C, 80 parts of an EPDM rubber, 40 parts of the highly water-absorptive resin, 60 parts of the inorganic water-absorbent A, 50 parts of the tackifier, 120 parts of the plasticizer, 2 parts of the vulcanizing agent A, 1 part of the vulcanizing agent B, 5 parts of zinc oxide, 75 parts of calcium carbonate and 20 parts of carbon black. The compound was extrusion-molded in the same manner as in Example 1 and the shaped compound was vulcanized by heating at 170° C. for 5 minutes.

The thus shaped and vulcanized test bodies had a tensile strength of 25.0 kgf/cm$^2$, 100% elastic modulus of 2.2 kgf/cm$^2$, ultimate elongation at break of 950% and degree of swelling $S_{21}$ of 170%. The test bodies swollen with water maintained the shape before swelling without collapsing.

EXAMPLE 4

A butyl rubber compound was prepared in the same manner as in Example 1 by thoroughly blending 100 parts of the butyl rubber C, 15 parts of the highly water-absorptive resin, 60 parts of the inorganic water-absorbent A, 10 parts of a polybutene as a tackifier, 100 parts of the plasticizer, 1 part of the vulcanizing agent A, 0.5 part of the vulcanization accelerator, 5 parts of zinc oxide, 50 parts of calcium carbonate and 15 parts of carbon black. The compound was extrusion-molded in the same manner as in Example 1 and the shaped compound was vulcanized by heating at 170° C. for 10 minutes.

The thus shaped and vulcanized test bodies had a tensile strength of 8.0 kgf/cm$^2$, 100% elastic modulus of 1.2 kgf/cm$^2$, ultimate elongation at break of 1850% and degree of swelling $S_{21}$ of 240%. The test bodies swollen with water maintained the shape before swelling without collapsing.

EXAMPLE 5

A butyl rubber compound was prepared in the same manner as in Example 1 by thoroughly blending 100 parts of the butyl rubber A, 10 parts of the highly water-absorptive resin, 60 parts of the inorganic water-absorbent B, 20 parts of the tackifier, 60 parts of the plasticizer, 1 part of the vulcanizing agent B, 1 part of the vulcanization accelerator, 5 parts of zinc oxide, 50 parts of calcium carbonate and 15 parts of carbon black. The compound was extrusion-molded in the same manner as in Example 1 and the shaped compound was vulcanized by heating at 170° C. for 10 minutes.

The thus shaped and vulcanized test bodies had a tensile strength of 3.0 kgf/cm$^2$, 100% elastic modulus of 1.0 kgf/cm$^2$, ultimate elongation at break of 2200% and degree of swelling $S_{21}$ of 220%. The test bodies swollen with water maintained the shape before swelling without collapsing.

EXAMPLE 6

A butyl rubber compound was prepared in the same manner as in Example 1 by thoroughly blending 30 parts of the butyl rubber B, 70 parts of the butyl rubber C, 10 parts of the highly water-absorptive resin, 60 parts of the inorganic water-absorbent A, 10 parts of a polybutene as the tackifier, 70 parts of the plasticizer, 2 parts of the vulcanizing agent A, 1 part of the vulcanizing agent B, 0.8 part of the vulcanization accelerator, 50 parts of the basic filler B, 5 parts of zinc oxide, 40 parts of calcium carbonate and 15 parts of carbon black. The compound was extrusion-molded in the same manner as in Example 1 and the shaped compound was vulcanized by heating at 170° C. for 7 minutes.

The thus shaped and vulcanized test bodies had a tensile strength of 1.80 kgf/cm$^2$, 100% elastic modulus of 1.50 kgf/cm$^2$, ultimate elongation at break of at least 2000% and degree of swelling $S_{21}$ of 260%. The test bodies swollen with water maintained the shape before swelling without collapsing.

COMPARATIVE EXAMPLE 1

A water-swellable butyl rubber compound was prepared in the same manner as in Example 1 by thoroughly blending 100 parts of the butyl rubber A, 20 parts of the highly water-absorptive resin, 80 parts of the inorganic water-absorbent A, 20 parts of the tackifier, 80 parts of the plasticizer, 0.5 part of the vulcanizing agent A, 5 parts of zinc oxide, 75 parts of calcium carbonate and 20 parts of carbon black. The compound was extrusion-molded in the same manner as in Example 1 and the shaped compound was vulcanized by heating at 170° C. for 8 minutes.

The thus shaped and vulcanized test bodies had a tensile strength of 2.2 kgf/cm$^2$, 100% elastic modulus of 0.8 kgf/cm$^2$ and ultimate elongation at break of at least 2000% but the degree of swelling $S_{2l}$ could not be measured due to collapsing of the water-swollen body in water.

COMPARATIVE EXAMPLE 2

A water-swellable butyl rubber compound was prepared in the same manner as in Example 1 by thoroughly blending 100 parts of the butyl rubber C, 10 parts of the highly water-absorptive resin, 120 parts of the inorganic water-absorbent A, 10 parts of a polybutene as the tackifier, 100 parts of the plasticizer, 3 parts of the vulcanizing agent A, 3 parts of the vulcanizing agent B, 2 parts of the vulcanization accelerator, 5 parts of zinc oxide, 50 parts of calcium carbonate and 15 parts of carbon black. The compound was extrusion-molded in the same manner as in Example 1 and the shaped compound was vulcanized by heating at 170° C. for 10 minutes.

The thus shaped and vulcanized test bodies had a tensile strength of 28 kgf/cm$^2$, 100% elastic modulus of 4.5 kgf/cm² and ultimate elongation at break of 750% but the degree of swelling $S_{21}$ was only 105% not to be serviceable as a water stop.

COMPARATIVE EXAMPLE 3

A vulcanizable SBR rubber compound was prepared in the same manner as in Example 1 by thoroughly blending 100 parts of an SBR, 7 parts of the plasticizer, 2 parts of the vulcanizing agent A, 3 parts of the vulcanization accelerator, 1 part of stearic acid, 3.5 parts of zinc oxide, 52.5 parts of calcium carbonate and 14 parts of carbon black. The compound was extrusion-molded and vulcanized by heating at 170° C. for 10 minutes to give test samples.

The thus shaped test bodies had a tensile strength of 185 kgf/cm², 100% elastic modulus of 15 kgf/cm² and ultimate elongation at break of 650% but the degree of swelling $S_{21}$ was only 100% showing almost no swelling with water not to meet the requirement for a water stop.

COMPARATIVE EXAMPLE 4

A water-swellable butyl rubber compound was prepared in the same manner as in Example 1 by thoroughly blending 100 parts of a reclaimed butyl rubber, 20 parts of a polyisobutylene, 15 parts of the highly water-absorptive resin, 72 parts of the inorganic water-absorbent A, 120 parts of bentonite, 20 parts of a polybutene as the tackifier, 68 parts of the plasticizer, 2 parts of the vulcanizing agent A, 1 part of the vulcanization accelerator and 5 parts of zinc oxide. The compound was extrusion-molded and vulcanized by heating at 170° C. for 10 minutes to give test samples.

The thus shaped test bodies had a tensile strength of 1.6 kgf/cm², 100% elastic modulus of 0.4 kgf/cm² and ultimate elongation at break of at least 2000% but the degree of swelling could not be determined because the test bodies became collapsed in the course of swelling in water.

EXAMPLE 7

A butyl rubber compound was prepared in the same manner as in Example 1 by thoroughly blending 50 parts of the butyl rubber C, 50 parts of a reclaimed butyl rubber, 20 parts of the highly water-absorptive resin, 90 parts of the inorganic water-absorbent A, 20 parts of the tackifier, 80 parts of the plasticizer, 2 parts of the vulcanizing agent A, 1 part of the vulcanizing agent B, 4 parts of zinc oxide, 60 parts of calcium carbonate and 16 parts of carbon black. The compound was extrusion-molded in the same manner as in Example 1 and the shaped compound was vulcanized by heating at 170° C. for 10 minutes.

The thus shaped and vulcanized test bodies had a tensile strength of 16.0 kgf/cm², 100% elastic modulus of 1.8 kgf/cm², ultimate elongation at break of 1150% and degree of swelling $S_{21}$ of 280%. The test bodies swollen with water maintained the shape before swelling without collapsing.

EXAMPLE 8.

A butyl rubber compound was prepared in the same manner as in Example 1 by thoroughly blending 50 parts of the butyl rubber B, 50 parts of the butyl rubber C, 30 parts of the highly water-absorptive resin, 30 parts of the inorganic water-absorbent A, 30 parts of the inorganic water-absorbent B, 30 parts of the tackifier, 80 parts of the plasticizer, 2 parts of the vulcanizing agent A, 1 part of the vulcanizing agent B, 5 parts of zinc oxide, 50 parts of calcium carbonate and 15 parts of carbon black. The compound was extrusion-molded in the same manner as in Example 1 and the shaped compound was vulcanized by heating at 170° C. for 10 minutes.

The thus shaped and vulcanized test bodies had a tensile strength of 15.8 kgf/cm², 100% elastic modulus of 2.8 kgf/cm², ultimate elongation at break of 1200% and degrees of swelling $S_7$, $S_{14}$ and $S_{21}$ of 220%, 350% and 381%, respectively. The test bodies swollen with water maintained the shape before swelling without collapsing.

EXAMPLE 9

A butyl rubber compound was prepared in the same manner as in Example 1 by thoroughly blending 100 parts of the butyl rubber C, 25 parts of the highly water-absorptive resin, 80 parts of the inorganic water-absorbent A, 10 parts of a polybutene as the tackifier, 100 parts of the plasticizer, 1 part of the vulcanizing agent A, 0.8 part of the vulcanizing agent B, 50 parts of the basic filler A, 5 parts of zinc oxide, 15 parts of carbon black and 40 parts of calcium carbonate. The compound was extrusion-molded in the same manner as in Example 1 and the shaped compound was vulcanized by heating at 170° C. for 4 minutes.

The thus shaped and vulcanized test bodies had a tensile strength of 1.10 kgf/cm², 100% elastic modulus of 1.1 kgf/cm², ultimate elongation at break of at least 2000% and degrees of swelling $S_7$, $S_{14}$ and $S_{21}$ of 250%, 390% and 416%, respectively. The test bodies swollen with water maintained the shape before swelling without collapsing.

EXAMPLE 10

A butyl rubber compound was prepared in the same manner as in Example 1 by thoroughly blending 100 parts of the butyl rubber A, 60 parts of the inorganic water-absorbent B, 20 parts of the highly water-absorptive resin, 20 parts of the tackifier, 60 parts of the plasticizer, 2 parts of the vulcanizing agent A, 1 part of the vulcanization accelerator, 60 parts of the basic filler A, 5 parts of zinc oxide and 15 parts of carbon black. The compound was extrusion-molded in the same manner as in Example 1 and the shaped compound was vulcanized by heating at 170° C. for 5 minutes.

The thus shaped and vulcanized test bodies had a tensile strength of 1.80 kgf/cm², ultimate elongation at break of at least 2000% and degrees of swelling $S_7$, $S_{14}$ and $S_{21}$ of 210%, 330% and 368%, respectively. The test bodies swollen with water maintained the shape before swelling without collapsing.

COMPARATIVE EXAMPLE 5

A full-vulcanization type rubber compound was prepared in the same manner as in Example 1 by thoroughly blending 100 parts of a polychloroprene rubber, 60 parts of the highly water-absorptive resin, 4 parts of magnesium oxide, 5 parts of zinc oxide, 7 parts of the plasticizer, 1 part of the vulcanizing agent B, 1 part of stearic acid and 2 parts of an aging retarder. The compound was extrusion-molded in the same manner as in Example 1 and the shaped compound was vulcanized by heating at 170° C. for 10 minutes.

The thus shaped and vulcanized test bodies had a tensile strength of 55 kgf/cm², 100% elastic modulus of 9 kgf/cm², ultimate elongation at break of 670% and degree of swelling $S_{21}$ of 610%. The water-swollen test bodies retained the shape before swelling without collapsing but the workability thereof as a water stop was poor due to the high rigidity.

COMPARATIVE EXAMPLE 6

An unvulcanizable adhesive butyl rubber compound was prepared in the same manner as in Example 1 by thoroughly blending 100 parts of the butyl rubber A, 10 parts of the tackifier, 100 parts of a polybutene as an additional tackifier, 150 parts of calcium carbonate and 30 parts of carbon black. The compound was extrusion-moled to give test samples.

The thus shaped test bodies had a tensile strength of 0.57 kgf/cm$^2$, 100% elastic modulus of 0.5 kgf/cm$^2$, ultimate elongation at break of 1600% and degree of swelling $S_{21}$ of 100% showing a very small swelling with water not to meet the requirement for a water stop.

COMPARATIVE EXAMPLE 7

A partial-vulcanization type butyl rubber compound was prepared in the same manner as in Example 1 by thoroughly blending 100 parts of a partially vulcanized butyl rubber Escolant-10, 30 parts of the highly water-absorptive resin, 40 parts of the inorganic water-absorbent A, 10 parts of the tackifier, 50 parts of a polybutene as an additional tackifier, 120 parts of calcium carbonate and 30 parts of carbon black. The compound was extrusion-molded to give test samples.

The thus shaped test bodies had a tensile strength of 7.0 kgf/cm$^2$, 100% elastic modulus of 4.4 kgf/cm$^2$ and ultimate elongation at break of 790%. The degree of swelling could not be determined because the test bodies became collapsed in the course of swelling in water.

COMPARATIVE EXAMPLE 8

A butyl rubber compound was prepared in the same manner as in Example 1 by thoroughly blending 50 parts of the butyl rubber A, 50 parts of the butyl rubber C, 80 parts of the highly water-absorptive resin, 10 parts of the tackifier, 80 parts of the plasticizer, 2 parts of the vulcanizing agent A, 1 part of the vulcanization accelerator, 10 parts of zinc oxide, 100 parts of calcium carbonate and 30 parts of carbon black. The compound was extrusion-molded in the same manner as in Example 1 and the shaped compound was vulcanized by heating at 170° C. for 5 minutes.

The thus shaped and vulcanized test bodies had a tensile strength of 3.50 kgf/cm$^2$, 100% elastic modulus of 2.6 kgf/cm$^2$, ultimate elongation at break of at least 1800% and degree of swelling $S_7$ of 320%. The thus prepared water stop had poor mechanical strengths and was collapsed during the further continued immersion in water.

What in claimed is:

1. A water-swellable adhesive water water stop which is a shaped and vulcanized body of a vulcanizable rubber composition comprising, as a blend:
    (A) 100 parts by weight of a butyl rubber;
    (B) from 1 to 50 parts by weight of a highly water-absorptive polymeric electrolyte;
    (C) from 30 to 200 parts by parts by weight of an inorganic water-absorbent;
    (D) from 10 to 50 parts by weight of a tackifier;
    (E) from 30 to 200 parts by weight of a plasticizer;
    (F) from 1 to 10 parts by weight of a vulcanizing agent or a combination of a vulcanizing agent and a vulcanization accelerator, and has a tensile strength in the range from 1 to 30 kgf/cm$^2$, 100% elastic modulus in the range from 1 to 4 kgf/cm$^2$, ultimate elongation at break of at least 300% and degree of swelling in water in the range from 150 to 500% after immersion in water for 21 days at 23° C., and
    (G) up to 300 parts by weight of a basic filler.

2. The water-swellable adhesive water stop as claimed in claim 1 wherein the inorganic water-absorbent has basicity.

3. The water-swellable adhesive water stop as claimed in claim 1 wherein the inorganic water-absorbent is selected from the group consisting of hydrated silicic acid, hydrated silicates and bentonite.

4. The water-swellable adhesive water stop as claimed in claim 1 wherein the basic filler is magnesium carbonate hydroxide or calcium carbonate hydroxide.

5. The water-swellable adhesive water stop as claimed in claim 1 wherein the vulcanizing agent as the component (F) is selected from the group consisting of sulfur, modified phenolic resins and thiuram compounds.

6. The water-swellable adhesive water stop as claimed in claim 1 wherein the vulcanization accelerator as a part of the component (F) is selected from the group consisting of thiourea compounds, thiazole compounds and carbamate compounds.

7. The water-swellable adhesive water stop as claimed in claim 1 wherein the amount of the vulcanization accelerator, when the component (F) is a combination of the vulcanizing agent and the vulcanization accelerator, does not exceed the amount of the vulcanizing agent.

* * * * *

UNITED STATES PATENT AND TRADEMARK OFFICE
CERTIFICATE OF CORRECTION

PATENT NO. : 5,290,844
DATED : March 1, 1994
INVENTOR(S) : Eiichi Otsuka

It is certified that error appears in the above-indentified patent and that said Letters Patent is hereby corrected as shown below:

Column 12, line 5, delete --water--(first occurrence)

Signed and Sealed this

Ninth Day of August, 1994

Attest:

BRUCE LEHMAN

*Attesting Officer*  *Commissioner of Patents and Trademarks*